United States Patent
Marko et al.

(10) Patent No.: US 6,387,336 B2
(45) Date of Patent: May 14, 2002

(54) METHOD AND DEVICE FOR SELECTIVE CATALYTIC NOX REDUCTION

(75) Inventors: Armin Marko, Stuttgart; Thomas Wahl, Pforzheim; Ulrich Alkemade, Leonberg; Frank Brenner, Remseck; Marc Bareis, Markgroeningen; Horst Harndorf, Schwieberdingen, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/254,291

(22) PCT Filed: Jun. 25, 1998

(86) PCT No.: PCT/DE98/01731

§ 371 Date: May 6, 1999

§ 102(e) Date: May 6, 1999

(87) PCT Pub. No.: WO99/01205

PCT Pub. Date: Jan. 14, 1999

(30) Foreign Application Priority Data

Jul. 3, 1997 (DE) .......................... 197 28 343

(51) Int. Cl.[7] .......................... B01D 53/54; B01D 53/60; F01N 3/035
(52) U.S. Cl. ................ 423/212; 423/239.1; 423/213.2; 422/177; 60/301; 60/286
(58) Field of Search ................ 423/212, 235, 423/239.1, 352, 237, 213.2; 95/132, 128; 60/301, 286; 422/177

(56) References Cited

U.S. PATENT DOCUMENTS

| | | | | |
|---|---|---|---|---|
| 3,531,246 A | * | 9/1970 | Matsen | 95/128 |
| 4,288,420 A | * | 9/1981 | Ito | 423/239.1 |
| 4,365,475 A | * | 12/1982 | Dunlap | 60/651 |
| 4,946,659 A | * | 8/1990 | Held | 423/212 |
| 5,289,690 A | * | 3/1994 | Rockenfeller | 62/77 |
| 5,342,599 A | * | 8/1994 | Slone | 423/365 |
| 5,809,775 A | * | 9/1998 | Tarabulski | 423/235 |
| 5,897,687 A | * | 4/1999 | Shimada | 95/128 |

FOREIGN PATENT DOCUMENTS

| | | |
|---|---|---|
| DE | 42 00 514 | 7/1993 |
| DE | 42 21 451 | 1/1994 |
| DE | 297 08 491 | 7/1997 |
| EP | 0 487 886 | 6/1992 |
| EP | 567964 | * 11/1993 |
| EP | 0 848 985 | 6/1998 |
| JP | 02 258017 | 10/1990 |
| WO | 94 11685 | 5/1994 |

* cited by examiner

Primary Examiner—Steven P. Griffin
Assistant Examiner—Maribel Medina
(74) Attorney, Agent, or Firm—Kenyon & Kenyon

(57) ABSTRACT

In a method and device for selective catalytic NOx reduction in oxygen-containing exhaust gases using ammonia and a reduction catalyst, gaseous ammonia is made available by heating a solid storage medium in a container. The method and device are suitable for use in motor vehicles in particular.

19 Claims, 2 Drawing Sheets

METHOD AND DEVICE FOR SELECTIVE CATALYTIC NOX REDUCTION

FIELD OF THE INVENTION

The present invention relates to a method and a device for selective catalytic reduction of NOx levels in oxygen-containing exhaust gases using ammonia and a reduction catalyst.

BACKGROUND INFORMATION

Ammonia is known as a selective and effective reduction agent for the catalytic reduction (SCR) of nitrogen oxides in oxygen-containing exhaust gases of internal combustion engines, for example.

For reasons of toxicity and safety problems arising from storing gaseous ammonia, in particular, procedures whereby ammonia is generated at the site of its use as a reduction agent by hydrolysis of urea have been developed.

European Patent No. 0 487 886 describes a method of quantitative hydrolysis of urea wherein an aqueous urea solution is sprayed onto an evaporator and forwarded via a hydrolysis catalyst with the surfaces of the evaporator and hydrolysis catalyst being coated with active components that catalyze the quantitative hydrolysis of urea into ammonia and $CO_2$ and inhibit the formation of solid urea reaction products.

The above-mentioned method has the disadvantage that a liquid must be added for preparing the reaction medium, and this liquid cannot be metered as accurately as a gaseous medium. Therefore, the gas stream that leaves the reduction catalyst usually still contains unreacted ammonia, which cannot be simply released into the atmosphere, but must be decomposed into non-toxic components using an oxidation catalyst.

The procedure is associated with high equipment costs due to the hydrolysis catalyst, as well as the transport of urea and its introduction, which must be uniform over the cross section of the flow.

The hydrolysis catalyst has the additional disadvantage that it absorbs ammonia at low temperatures. If the temperature rises quickly, most of the absorbed ammonia is released and can no longer be used as a reduction agent for selective catalytic reduction.

The use of an aqueous urea solution causes other problems—in winter operation of motor vehicles and due to the drop in exhaust gas temperature because of water evaporating in the exhaust gas: the 30%–35% aqueous urea solution used in the related art has a freezing point of about −11° C. At lower temperatures, particularly at the freezing point of diesel fuel, the operation of the motor vehicle is no longer ensured. While the freezing point can be lowered using additives, additives such as ammonium formiate, for example, are usually particularly corrosive, so that their use poses new problems.

The exhaust gas is cooled by about 20 K due to the need of evaporating the water it contains. The unsatisfactory low-temperature performance of SCR catalysts is particularly strongly manifested in this case.

SUMMARY OF THE INVENTION

The method according to the present invention has the advantage over the related art that a gaseous reduction agent is provided, which can be accurately metered, causes no problems in winter operation and thus requires no additional antifreeze measures; the problem of poor low-temperature performance of SCR catalysts is thus somewhat alleviated with its use.

In addition, the device for carrying out the method according to the present invention is relatively simple, since no urea hydrolysis catalyst is used, in addition to being compact due to the fact that ammonia in the solid storage medium according to the present invention takes up 3 times less space than the aqueous urea solution. The space thus freed up can possibly be used for an additional SCR unit.

The requirements for the metering system are less stringent, since, in contrast with a urea-water solution, clogging problems in the metering components cannot occur.

There is no more need for compressed air support for introducing the reduction agent, since a sufficient pressure gradient with respect to the exhaust system is always created when ammonia is released. The system is therefore equally well suited for use in passenger cars and utility vehicles.

In contrast with methods using gaseous ammonia, safety problems are alleviated, since the ammonia carried in the vehicle is mostly bound to the storage substance, i.e., it is not freely available.

Furthermore, it is particularly advantageous that the solid storage media used according to the present invention are regeneratable, i.e., the emptied container can be refilled with ammonia. The number of regeneration cycles may be as high as 1000.

Strontium chloride $SrCl2$, which has a high storage density for ammonia, comparable to the storage density of solid urea, can be advantageously used as the solid storage medium. Strontium chloride can be replaced totally or in part by calcium chloride, which offers comparable advantages.

It is particularly advantageous to use the waste heat of the engine coolant and/or the exhaust gas to heat the solid storage medium.

The device according to the present invention can be advantageously equipped with a buffer container for gaseous ammonia in order to have gaseous ammonia available even in intermittent engine operation and/or in start phases, regardless of the heating phase of container 1, when there is insufficient energy for heating the ammonia storage medium.

DETAILED DESCRIPTION

Figure 1:
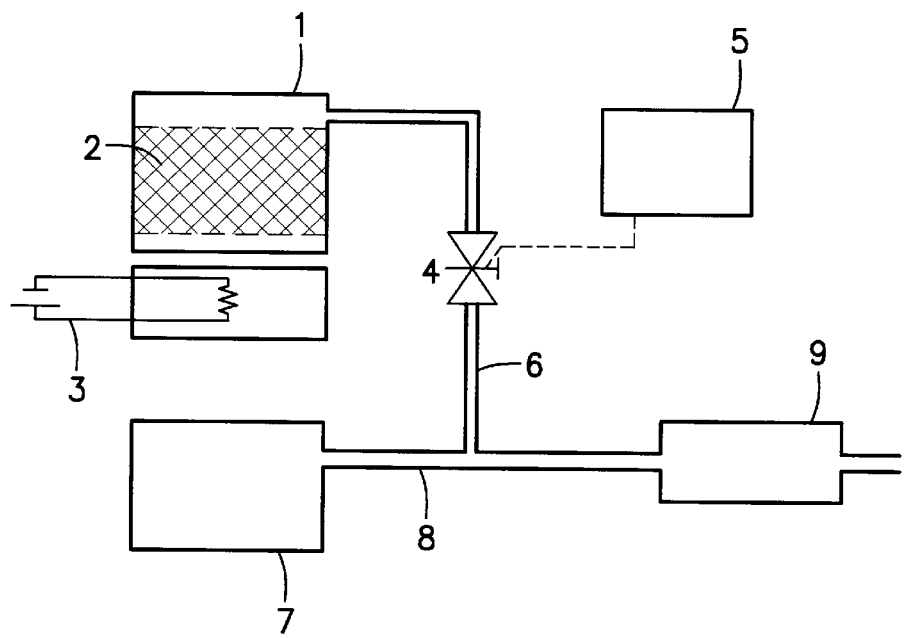
FIG. 1 schematically shows a device according to the present invention for carrying out the method according to the present invention in a motor vehicle.

The device of FIG. 1 has a container 1, which can be heated using a heating device 3 and contains ammonia-storing substance 2.

The volume of container 1 is designed so that there is sufficient ammonia available to remove NOx from the exhaust gas of an internal combustion engine with the help of the catalyst system within an interval between servicings of the vehicle. It has been shown that a volume of approximately 10 liters is particularly suitable.

Substances that store ammonia at ambient conditions (approximately 20° C.) so that the ammonia vapor pressure over the storage medium is low in a closed system (<0.5 bar) can be used as solid storage media.

The solid storage media according to the present invention may contain substances that bind ammonia by physical and/or chemical adsorption, such as active carbon, zeolites, etc., for example.

Substances that bind ammonia in the form of a chemical complex can also be used as solid storage media. These include, for example, salts, in particular chlorides and/or sulfates of one or more alkaline earth metals and/or of one or more 3 d subgroup elements, preferably manganese, iron, cobalt, nickel, copper and/or zinc, can be considered.

A solid storage medium containing strontium chloride SrCl2 is advantageously used. Strontium chloride stores up to eight ammonia molecules per strontium ion, forming [(Sr(NH3)8]Cl2. With an approximate density of 1.5 g/cm³, a stored amount of 48 moles $NH_3$ results per liter of storage medium. In comparison, urea, with a density of 1.32 g/cm³, provides storage of 44 moles of ammonia per liter of solid urea. Strontium chloride can be replaced totally or in part with calcium chloride.

In the case of [(Sr(NH3)8]Cl2, perceptible release of ammonia begins at approximately 30° C., resulting in an ammonia vapor pressure of approximately 0.8 bar. At 80° C., the ammonia vapor pressure is about 8 bar. The device should be operated so that the pressure in container 1 is preferably between 2 and 10 bar.

An electric heating system and/or a heating device that uses the waste heat of the engine coolant and/or the exhaust gas can be used as heating device 3.

The gaseous ammonia formed when the solid storage medium is heated is metered via an electrically or pneumatically actuated valve 4, controlled by a controller 5, via ammonia supply line 6, into the exhaust gas line 8 between engine 7 and catalyst 9.

Figure 2:
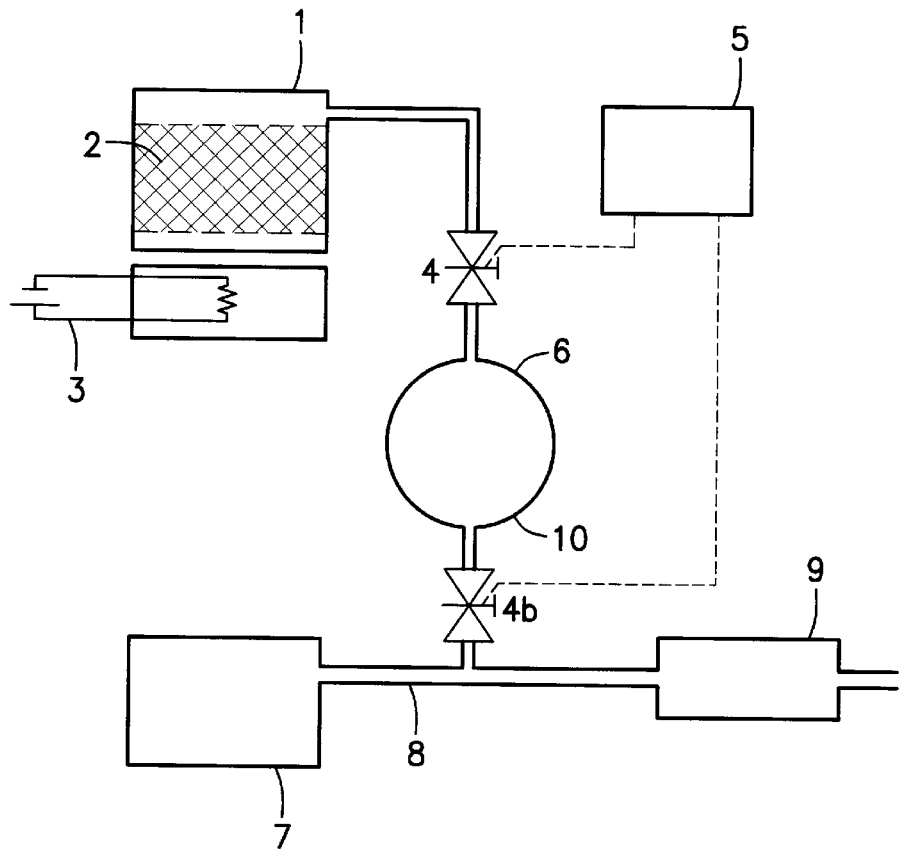
FIG. 2 shows a specifically adapted embodiment of a device according to the present invention for carrying out the method according to the present invention in a motor vehicle.

According to a preferred embodiment illustrated in FIG. 2, a buffer container 10 is connected between valve 4 and exhaust gas line 8. Buffer container 10 is connected to exhaust gas line 8 via a valve 4b controlled by controller 5. When the vehicle is turned off, valves 4 and 4b are closed, so that buffer container 10 is filled with gaseous ammonia under pressure. Thus, with the device according to FIG. 2, stored gaseous ammonia can be available even immediately after starting the engine, regardless of the heating phase of container 1.

Figure 3:
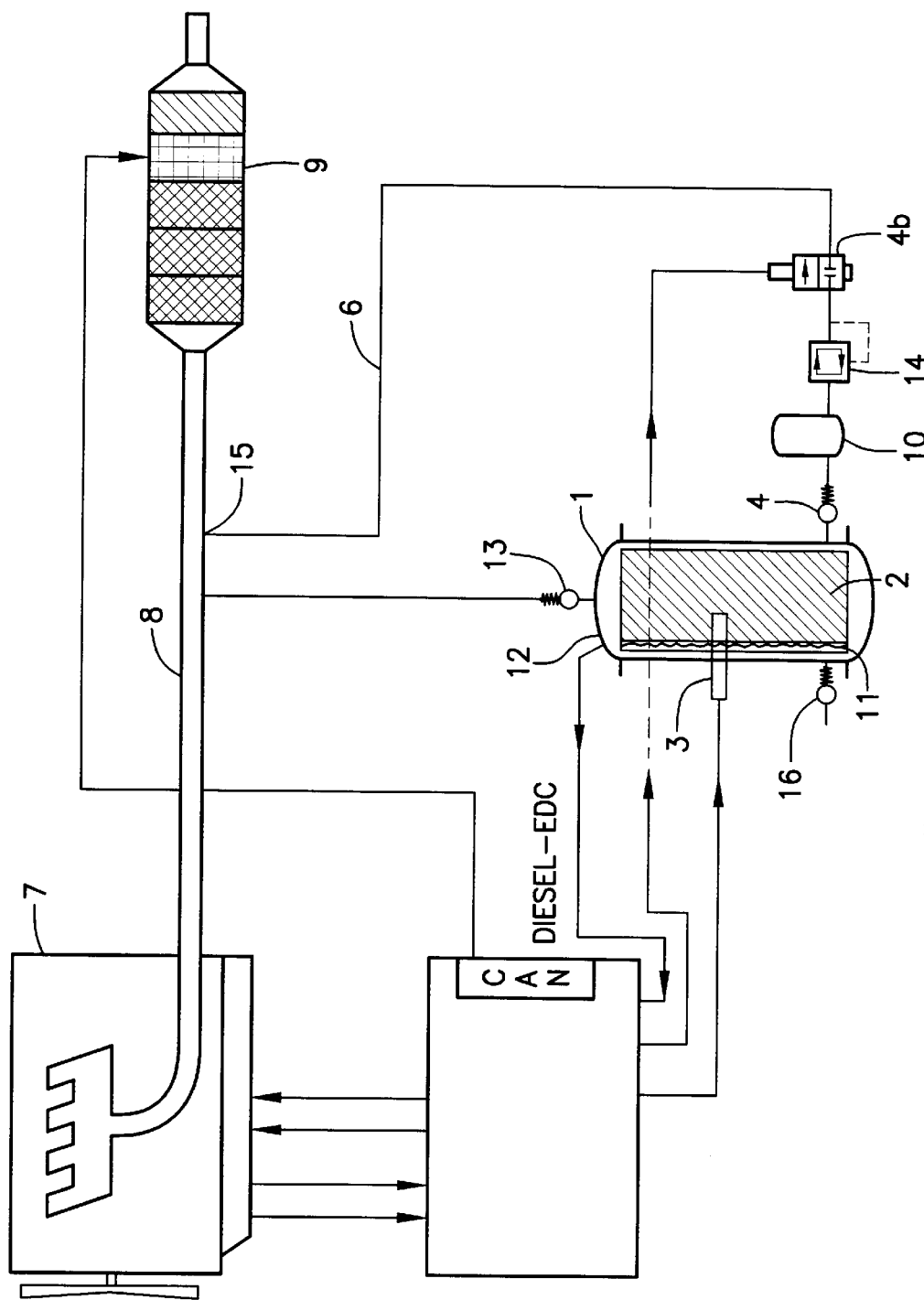
FIG. 3 shows an additional specifically adapted embodiment of a device according to the present invention for carrying out the method according to the present invention in a motor vehicle.

One system having additional advantageous devices is illustrated in FIG. 3.

A filling nozzle with integrated check valve 16, which prevents ammonia being supplied from escaping through the filling opening, is provided for filling container 1.

A finely porous, sieve-like construction 11 prevents the granulated storage substance 2 in container 1 from being entrained to the outside.

A pressure sensor 12 is mounted on container 1 for control and safety; it interrupts the supply of heat when a predefined maximum pressure level is attained. Furthermore, a safety valve 13 (opening pressure approximately 10 to 15 bar) is provided, which responds to an excessively steep increase in the storage container pressure and conducts the released ammonia into the exhaust line, for example.

A pressure limiter 14, which ensures the required ammonia pressure of 2 to 3 bar, is provided downstream from buffer container 10.

At a suitable point upstream from catalyst 9, an ammonia metering station 15, for example, a metering tube with a screen, is provided to guarantee proper mixing of ammonia with the exhaust gas stream.

An electronic controller (Diesel EDC), in which additional functions adjusting the amount of ammonia to the actual operating state of the engine are implemented, monitors and controls the procedures.

What is claimed is:

1. A method for providing a selective catalytic $NO_x$ reduction in an oxygen-containing exhaust gas of an engine by using a gaseous ammonia and a reduction catalyzer, the method comprising the steps of:
   introducing a solid storage medium into a container, the solid storage medium storing ammonia;
   heating the solid storage medium to provide the gaseous ammonia;
   charging a quantity of the gaseous ammonia into the exhaust gas to provide a charged ammonia quantity; and
   adapting the charged ammonia quantity to an actual operating condition of the engine via a control device.

2. The method according to claim 1, wherein the solid storage medium binds ammonia by adsorption.

3. The method according to claim 1, wherein the solid storage medium binds ammonia in a form of a chemical complex.

4. The method according to claim 1, wherein the solid storage medium includes at least one salt.

5. The method according to claim 4, wherein the at least one salt includes at least one of a chloride and a sulfate of at least one alkaline earth metal.

6. The method according to claim 4, wherein the at least one salt includes at least one of a chloride and a sulfate of at least one of manganese, iron, cobalt, nickel, copper and zinc.

7. The method according to claim 4, wherein the at least one salt includes at least one of manganese, iron, cobalt, nickel, copper and zinc.

8. The method according to claim 1, wherein the solid storage medium includes at least one of strontium chloride and calcium chloride.

9. The method according to claim 1, wherein the solid storage medium is heated in the heating step by at least one of an electric heating system, a waste heat of an engine coolant and a waste heat of an exhaust gas.

10. The method according to claim 1, wherein the solid storage medium is heated in the heating step to a temperature within 50° C. to 200° C.

11. The method according to claim 10, wherein the solid storage medium is heated in the heating step to a temperature within 80° C. to 150° C.

12. The method according to claim 1, wherein the solid storage medium is heated in the heating step to an ammonia vapor pressure within 0.1 bar to 30 bar.

13. The method according to claim 12, wherein the solid storage medium is heated in the heating step to an ammonia vapor pressure within 2 bar to 10 bar.

14. The method according to claim 1, wherein the solid storage medium includes at least one of a halogen, an alkaline earth metal, manganese, iron, cobalt, nickel, copper and zinc.

15. The method according to claim 14, wherein the halogen includes chlorine and the alkaline earth metal includes at least one of strontium and calcium.

16. A device for providing a selective catalytic $NO_x$ reduction in an oxygen-containing exhaust gas of an engine by using a gaseous ammonia and a reduction catalyzer, the device comprising:
- a supply line adapted to supply the gaseous ammonia into an exhaust line between the engine and the reduction catalyzer;
- a container for containing a solid storage medium, the solid storage medium storing ammonia;
- a valve arrangement for coupling the supply line to the container;
- a heating device for heating the container; and
- a control device for adapting a quantity of gaseous ammonia conveyed to the exhaust line via a charging arrangement to an actual operating condition of the engine.

17. The device according to claim 16, wherein the supply line includes a buffer container for containing the gaseous ammonia and another valve arrangement for metering the gaseous ammonia from the buffer container into the exhaust line.

18. The device according to claim 16, wherein the solid storage medium includes at least one of a halogen, an alkaline earth metal, manganese, iron, cobalt, nickel, copper and zinc.

19. The device according to claim 18, wherein the halogen includes chlorine and the alkaline earth metal includes at least one of strontium and calcium.

* * * * *